United States Patent
Kim et al.

(10) Patent No.: US 10,396,336 B2
(45) Date of Patent: Aug. 27, 2019

(54) SECONDARY BATTERY

(71) Applicant: SAMSUNG SDI CO., LTD., Yongin-si, Gyeonggi-do (KR)

(72) Inventors: Yuna Kim, Yongin-si (KR); Jangho Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 164 days.

(21) Appl. No.: 14/846,415

(22) Filed: Sep. 4, 2015

(65) Prior Publication Data

US 2016/0141588 A1    May 19, 2016

(30) Foreign Application Priority Data

Nov. 19, 2014  (KR) .................. 10-2014-0161668

(51) Int. Cl.
*H01M 2/26* (2006.01)
*H01M 10/0525* (2010.01)
*H01M 2/04* (2006.01)
*H01M 2/20* (2006.01)

(52) U.S. Cl.
CPC .............. *H01M 2/26* (2013.01); *H01M 2/043* (2013.01); *H01M 2/0404* (2013.01); *H01M 2/0473* (2013.01); *H01M 2/20* (2013.01); *H01M 2/263* (2013.01); *H01M 10/0525* (2013.01); *H01M 2220/20* (2013.01); *H01M 2220/30* (2013.01)

(58) Field of Classification Search
CPC ......... H01M 10/0525; H01M 2220/20; H01M 2220/30; H01M 2/0404; H01M 2/043; H01M 2/0473; H01M 2/20; H01M 2/26; H01M 2/263

See application file for complete search history.

(56) References Cited

U.S. PATENT DOCUMENTS

| | | | |
|---|---|---|---|
| 2009/0186269 A1* | 7/2009 | Kim | H01M 2/043 429/179 |
| 2010/0233528 A1* | 9/2010 | Kim | H01M 2/043 429/178 |

FOREIGN PATENT DOCUMENTS

| | | |
|---|---|---|
| EP | 2 375 475 A1 | 10/2011 |
| EP | 2 393 145 A1 | 12/2011 |
| EP | 2 453 501 A1 | 5/2012 |
| KR | 2001-0008566 A | 2/2001 |
| KR | 2001-0069004 A | 7/2001 |
| KR | 2009-0041856 A | 4/2009 |

OTHER PUBLICATIONS

EPO Search Report dated Nov. 30, 2015, for corresponding European Patent application 15189686.7, (5 pages).

\* cited by examiner

*Primary Examiner* — Lingwen R Zeng
(74) *Attorney, Agent, or Firm* — Lewis Roca Rothgerber Christie LLP (57) ABSTRACT

A secondary battery includes: an electrode assembly; an electrode lead attached to an electrode tab extending from the electrode assembly, the electrode lead having a through-hole formed therein; a case accommodating the electrode assembly and the electrode lead; and a cap plate coupled to the case to seal an opening of the case and including a protrusion part protruding to the inside of the case, the protrusion part being coupled to the electrode lead through the through-hole by riveting, and the cap plate has at least one rivet groove formed around a periphery of the protrusion part.

12 Claims, 6 Drawing Sheets

SECONDARY BATTERY

CROSS-REFERENCE TO RELATED APPLICATION

This application claims priority to Korean Patent Application No. 10-2014-0161668, filed on Nov. 19, 2014 in the Korean Intellectual Property Office, the entire content of which is hereby incorporated by reference.

BACKGROUND

1. Field

Aspects of embodiments of the present invention relate to a secondary battery.

2. Description of the Related Art

In general, unlike a primary battery that is not rechargeable, a secondary battery can be discharged and recharged.

According to technology developments and increases in production of mobile devices such as mobile phones and laptop computers, demand for secondary batteries as an energy source is rapidly increasing. Recently, as an alternative energy source to fossil fuels, research into secondary batteries for use in electric vehicles or hybrid vehicles has been actively conducted.

However, an external impact such as a dropping impact during impact resistance tests such as drop tests and oscillation tests or during distribution or use of products may cause an inner short circuit in secondary batteries.

SUMMARY

According to an aspect of embodiments of the present invention, a secondary battery is configured such that a cap plate is suppressed from extending when a protrusion part is coupled to an electrode lead by riveting using a through-hole by forming a rivet groove around the protrusion part protruding on a bottom surface of the cap plate.

According to another aspect of embodiments of the present invention, in a secondary battery, an electrode lead is prevented or substantially prevented from being twisted when a protrusion part is coupled to the electrode lead by riveting by varying shapes of a rivet groove formed around the protrusion part, and which can more effectively suppress a cap plate from extending.

These and other aspects of the present invention will be described in or be apparent from the following description of some exemplary embodiments.

According to one or more embodiments of the present invention, a secondary battery includes: an electrode assembly; an electrode lead attached to an electrode tab extending from the electrode assembly, the electrode lead having a through-hole formed therein; a case accommodating the electrode assembly and the electrode lead; and a cap plate coupled to the case to seal an opening of the case and including a protrusion part protruding to the inside of the case, the protrusion part being coupled to the electrode lead through the through-hole by riveting, and the cap plate has at least one rivet groove formed around a periphery of the protrusion part.

The at least one rivet groove may have a ring shape, a rectangular shape, or a polygonal shape to surround the periphery of the protrusion part.

The at least one rivet groove may include a pair of rivet grooves linearly formed at one side of the periphery of the protrusion part and the other side opposite to the one side to be spaced apart from each other and to be parallel with each other.

The at least one rivet groove may include a pair of rivet grooves formed in a curved manner at one side of the periphery of the protrusion part and the other side opposite to the one side to be spaced apart from each other and to be symmetrical to each other about the protrusion part.

The at least one rivet groove may be configured to receive the protrusion part compressed by a pressure applied thereto when the protrusion part is coupled to the electrode lead through the through-hole by riveting.

The protrusion part may include a body part extending from the cap plate and protruding to the inside of the case; and a deformation part at an end of the body part and configured to spread to the outside of the body part by pressure applied to the protrusion part.

The deformation past may extend over the at least one rivet groove.

A diameter of the through-hole may be greater than or equal to a diameter of the protrusion part.

A diameter of the at least one rivet groove may be greater than a diameter of the through-hole.

The electrode lead may include a first part horizontally arranged to face the cap plate and having the through-hole; and a second part bent from the first part to face the electrode tab.

In the secondary battery according to embodiments of the present invention, a cap plate can be prevented or substantially prevented from extending when a protrusion part is coupled to an electrode lead by riveting using a through-hole by forming a rivet groove around the protrusion part protruding on a bottom surface of the cap plate.

In addition, in the secondary battery according to embodiments of the present invention, an electrode lead can be prevented or substantially prevented from being twisted when a protrusion part is coupled to the electrode lead by riveting by varying shapes of a rivet groove formed around the protrusion part, and which can more effectively prevent or substantially prevent a cap plate from extending.

BRIEF DESCRIPTION OF THE DRAWINGS

The above and other features and aspects of the present invention will become more apparent by describing in detail some exemplary embodiments thereof with reference to the attached drawings in which.

DETAILED DESCRIPTION

Reference will now be made in further detail to the some exemplary embodiments of the present invention, with reference to the accompanying drawings.

Various aspects of embodiments of the present invention may be embodied in many different forms and should not be construed as being limited to the example embodiments set forth herein. Rather, these example embodiments of the disclosure are provided so that this disclosure will be thorough and complete and will convey various aspects of the disclosure to those skilled in the art. As those skilled in the art would realize, the described embodiments may be modified in various different ways, all without departing from the spirit or scope of the present invention. Accordingly, the drawings and description are to be regarded as illustrative in nature and not restrictive.

In the drawings, the thicknesses of layers and regions may be exaggerated for clarity. Here, like reference numerals refer to like elements throughout. As used herein, the term "and/or" includes any and all combinations of one or more of the associated listed items.

In addition, the terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises," and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms "first," "second," etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

In addition, as used herein, the term "secondary battery" is intended to include a rechargeable secondary battery, such as a lithium on battery, a lithium polymer battery, a lithium on polymer battery, or the like, a small-sized battery employed to a smart phone, a mobile phone, a tablet PC, a notebook computer, a digital camera, or the like, and/or a large-sized battery employed to an electric vehicle, a hybrid vehicle, an electric bicycle, an electric motorcycle, or the like, but aspects of the present invention are not limited thereto.

Figure 1:
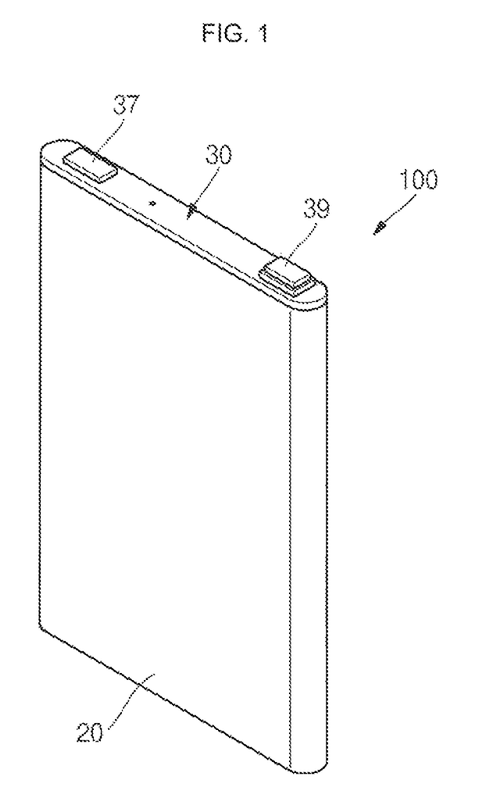
FIG. 1 is a perspective view of a secondary battery according to an embodiment of the present invention.
Figure 2:
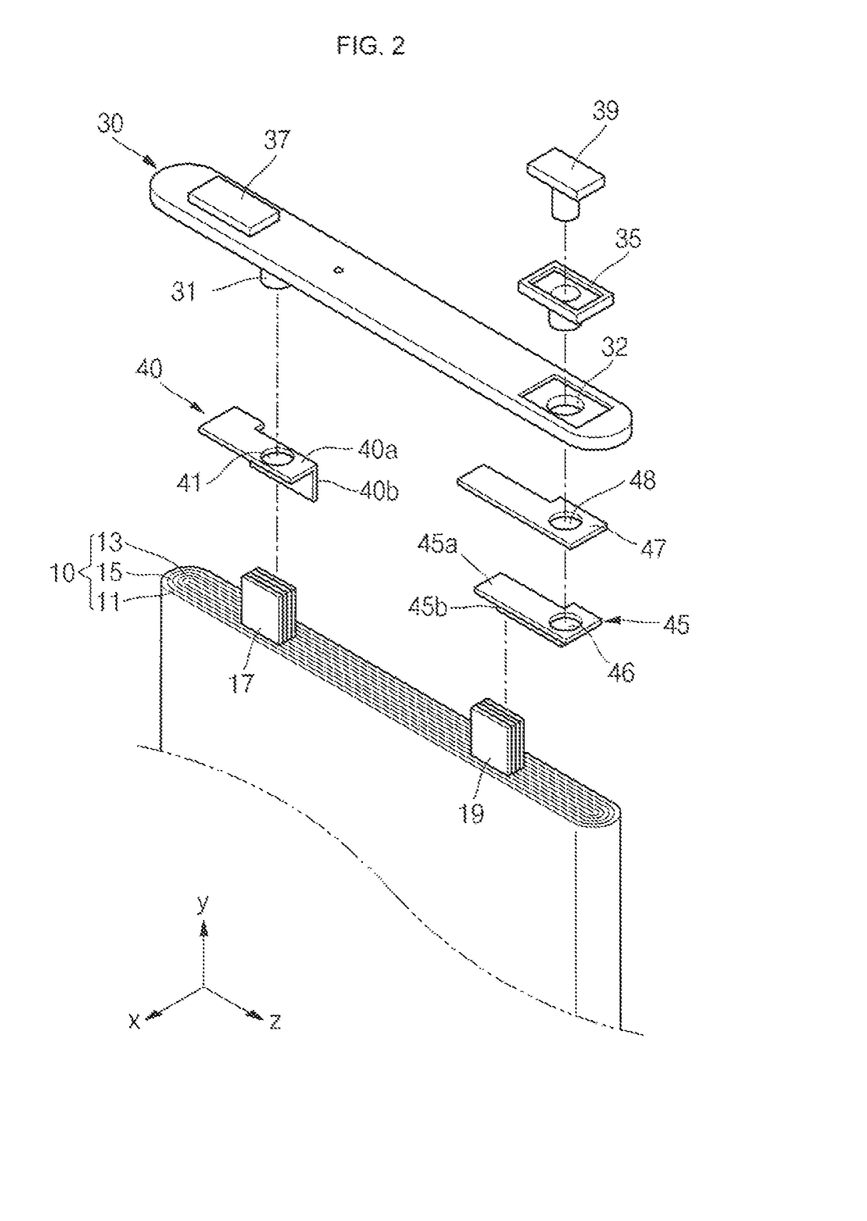
FIG. 2 is a partial exploded perspective view of the secondary battery shown in FIG. 1.

FIG. 1 is a perspective view of a secondary battery according to an embodiment of the present invention; and FIG. 2 is a partial exploded perspective view of the secondary battery shown in FIG. 1.

Referring to FIGS. 1 and 2, a secondary battery 100 according to an embodiment of the present invention includes an electrode assembly 10, an electrode lead disposed on the electrode assembly 10, a case 20 accommodating the electrode assembly 10 and the electrode lead, and cap plate 30 sealing a top portion of the case 20.

The electrode assembly 10 includes a positive electrode plate 11, a negative electrode plate 13, and a separator 15 and is sealed in the case 20 together with an electrolyte solution (not shown).

For example, the electrode assembly 10 may be formed by winding a stacked structure of the positive electrode plate 11, the negative electrode plate 13, and the separator 15 in a jelly roll configuration or by stacking the stacked structure in a rectangular type. The positive electrode plate 11 may be formed by coating a positive active material on at least one surface of a positive current collector (not shown). Similarly, the negative electrode plate 13 may be formed by coating a negative active material on at least one surface of a negative current collector (not shown). In an exemplary embodiment of the present invention, the positive electrode plate 11 may be arranged at the outermost side of the electrode assembly 10. This is for the purpose of facilitating heat dissipation through a case 20 by arranging the positive current collector (not shown) generating a relatively large amount of heat at the exterior side adjacent to the case 20. For example, the positive current collector may come in direct contact with the case 20 or may come in thermal contact with the case 20. As used herein, the phrase "thermal contact" is intended to mean that thermal exchange is permitted between both components even if they are not brought into direct contact with each other.

The electrode assembly 10 may be accommodated in the case 20 together with the electrolyte solution (not shown) through an open top end of the case 20, and the open to end of the case 20 may be sealed by the cap plate 30. In one embodiment, contact portions of the cap plate 30 and the case 20 may be coupled to each other by laser welding.

A positive electrode tab 17 and a negative electrode tab 19 may be connected to at least one region of the positive electrode plate 11 and the negative electrode plate 13. Throughout the specification, the positive electrode tab 17 and the negative electrode tab 19 may be collectively referred to as electrode tabs 17 and 19. In a case of a high-capacity, high-output battery, a plurality of positive electrode tabs 17 and a plurality of negative electrode tabs 19 may extend from the electrode assembly 10. A high output current can be obtained through the plurality of positive electrode tabs 17 and the plurality of negative electrode tabs 19, and a resistance loss can be reduced. The positive electrode tab 17 and the negative electrode tab 19 may be separately prepared to then be attached to the positive electrode plate 11 and the negative electrode plate 13, respectively.

The positive electrode tab 17 may be connected to the cap plate 30, and the negative electrode tab 19 may be connected to a negative electrode terminal 39 extending to a top surface of the cap plate 30. In one embodiment, a positive electrode terminal 37 and the negative electrode terminal 39 may be exposed to the top surface of the cap plate 30. The positive electrode terminal 37 may be a part integrally protruding from the cap plate 30 or may be formed as a separate member coupled to be mounted on the top surface or the cap plate 30. The positive electrode terminal 37 may have the same polarity as the cap plate 30, (that is, a positive polarity). The negative electrode terminal 39 may be assembled to pass through the cap plate 30. The negative electrode terminal 39 may be engaged with the cap plate 30 in an insulating manner and may extend to the top surface of the cap plate 30.

The positive electrode tab 17 and the negative electrode tab 19 are connected to a positive electrode lead 40 and a negative electrode lead 45, respectively, under the cap plate 30.

Before the positive electrode tabs 17 are connected to the positive electrode lead 40, they may be collected into one bundle, such as through tack welding, to then be focused. Likewise, before the negative electrode tabs 19 are connected to the negative electrode lead 45, they may be collected into one bundle, such as through tack welding, to then be focused.

The positive electrode lead 40 is connected to the cap plate 30. The positive electrode lead 40 may be bent in a generally "L" shape.

In one embodiment, the positive electrode lead 40 may have a first part 40*a* and a second part 40*b*, which extend and are bent relative to each other in two different directions. The first part 40*a* of the positive electrode lead 40 is disposed to face the cap plate 30 to be engaged with the cap plate 30. In one embodiment, a protrusion part 31 protruding from a bottom surface of the cap plate 30 is assembled to pass through a through-hole 41 formed in the first part 40*a* of the positive electrode lead 40, and a bottom end of the protrusion part 31 exposed to a bottom surface of the positive electrode lead 40 may be compressively coupled to the bottom surface of the positive electrode lead 40 by riveting. That is, the protrusion part 31 is configured such that the bottom end of the protrusion part 31 is compressed against the bottom surface of the positive electrode lead 40 by striking the bottom end of the protrusion part 31 exposed to the bottom surface of the positive electrode lead 40 using a hammer, for example.

The second part 40*b* of the positive electrode lead 40 extending in a different direction from the first part 40*a* of the positive electrode lead 40 is disposed to face the positive electrode tab 17 to then be engaged with the positive electrode tab 17. In order to establish a coupling structure of the cap plate 30 and the positive electrode tab 17, the positive electrode lead 40 may be bent in different directions so as to face the element to be coupled.

Accordingly, the positive electrode tab 17 of the electrode assembly 10 is electrically connected to the cap plate 30 through the positive electrode lead 40. While the cap plate 30 generally has the same polarity as the positive electrode tab 17 (that is, a positive polarity), the positive electrode terminal 37 may be formed by allowing a portion of the cap plate 30 to protrude.

The negative electrode lead 45 is connected to the negative electrode terminal 39. Accordingly, the negative electrode tab 19 of the electrode assembly 10 is electrically connected to the negative electrode terminal 39 through the negative electrode lead 45.

Throughout the specification, the positive electrode lead 40 and the negative electrode lead 45 may be collectively referred to as electrode leads 40 and 45.

The negative electrode lead 45 may be bent in a generally "L" shape. In one embodiment, the negative electrode lead 45 may have a first part 45*a* and a second part 45*b*. The first part 45*a* of the negative electrode lead 45 is disposed to face the cap plate 30 to be engaged with the cap plate 30. The second part 45*b* of the negative electrode lead 45 extending in a different direction from the first part 45*a* of the negative electrode lead 45 is disposed to face the negative electrode tab 19 to be engaged with the negative electrode tab 19. In one embodiment, in order to establish a coupling structure of the cap plate 30 and the negative electrode tab 19, the negative electrode lead 45 may be bent in different directions so as to face the element to be coupled, but aspects of the present invention are not limited thereto. For example, in another embodiment, the negative electrode lead 45 may be shaped as a planar plate.

The negative electrode terminal 39 is assembled to the cap plate 30 with an insulating gasket 35 interposed therebetween. A terminal hole 32 is formed in the cap plate 30 to allow the negative electrode terminal 39 to pass therethrough. The negative electrode terminal 39 is fitted into the terminal hole 32 of the cap plate 30 with the insulating gasket 35 interposed between the negative electrode terminal 39 and the cap plate 30, such that the negative electrode terminal 39 is electrically insulated from the cap plate 30. The insulating gasket 35 seals the periphery of the terminal hole 32 to prevent or substantially prevent leakage of the electrolyte solution (not shown) contained in the case 20 and to prevent or substantially prevent external impurities from permeating.

In one embodiment, a bottom portion of the negative electrode terminal 39 is compressively coupled to a bottom surface of the negative electrode lead 45, and welding may be further performed on the bottom portion of the negative electrode terminal 39, thereby more tightly coupling the negative electrode terminal 39 to the negative electrode lead 45. The coupling between the negative electrode terminal 39 and the negative electrode lead 45 forms a charging/discharging path of a negative electrode. Meanwhile, an upper portion of the negative electrode terminal 39 protrudes in a plate-like shape from its cylindrical body to then be compressed on a top surface of the cap plate 30.

An insulation plate 47 may be interposed between the negative electrode lead 45 and the cap plate 30 to achieve electrical insulation. The insulation plate 47 in cooperation with the insulating gasket 35 may electrically insulate the cap plate 30 from the negative electrode lead 45 and may prevent or substantially prevent the cap plate 30 electrically connected to the positive electrode tabs 17 of the electrode assembly 10 from electrically conducting with the opposite polarity. Terminal holes 46 and 48 may be formed in the negative electrode lead 45 and the insulation plate 47 to allow the negative electrode terminal 39 to pass therethrough, respectively.

The negative electrode terminal 39 is assembled to pass through the terminal holes 32, 48, and 46 of the cap plate 30, the insulation plate 47, and the negative electrode lead 45, and the bottom portion of the negative electrode terminal 39 may be compressed on the bottom surface of the negative electrode lead 45, thereby coupling the cap plate 30, the insulation plate 47, and the negative electrode lead 45 to one another into a single body in a position-aligned manner.

In one embodiment, for example, the cap plate 30, the insulation plate 47, and the negative electrode lead 45 are stacked such that they are laid one on top of another, the negative electrode terminal 39 is fitted into the terminal holes 32, 48, and 46 from the upper portion of the cap plate 30 for being assembled, and riveting or spinning is performed on the lower portion of the negative electrode terminal 39 exposed to the bottom surface of the negative electrode lead 45, thereby assembling the negative electrode terminal 39 in a state in which it is compressed on the bottom surface of the negative electrode lead 45.

In one embodiment, in a similar manner in which the insulation plate 47 is disposed between the cap plate 30 and the negative electrode lead 45, an insulation plate (not shown) may also be disposed between the cap plate 30 and the positive electrode lead 40.

Figure 3:
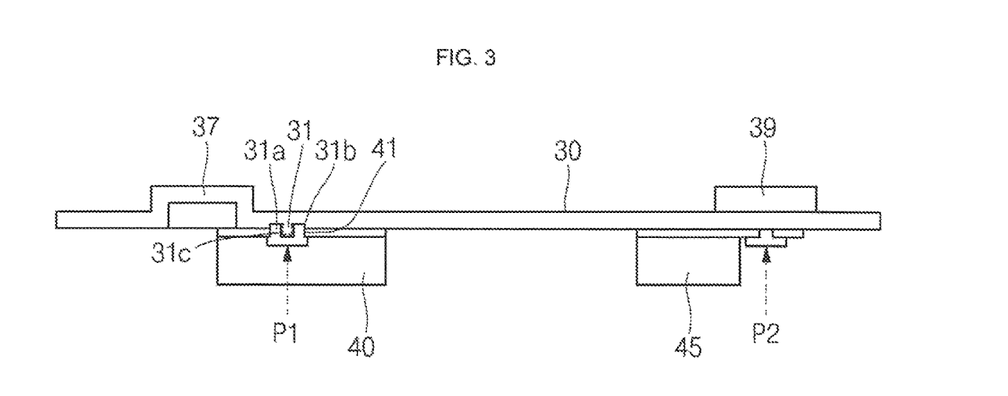
FIG. 3 is a side view illustrating a connection relationship between each of a cap plate, a positive electrode lead, and a positive electrode tab in the secondary battery shown in FIG. 1.
Figure 4:
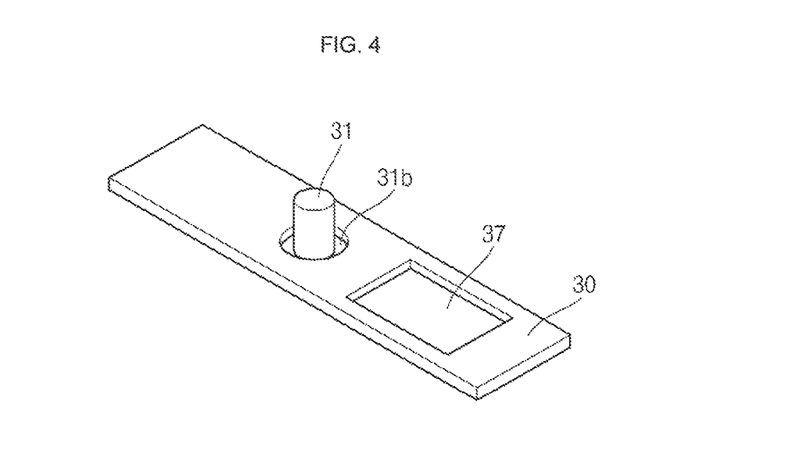
FIG. 4 is a bottom perspective w of a cap plate having a protrusion part in the secondary battery shown in FIG. 1.

FIG. 3 is a side view illustrating a connection relationship between each of the cap plate 30, the positive electrode lead 40, and the positive electrode tab 17 in the secondary battery 100; and FIG. 4 is a bottom perspective view illustrating the cap pate 30 having the protrusion part 31 in the secondary battery 100.

Referring to FIGS. 3 and 4, the cap plate 30 includes the protrusion part 31 protruding on a bottom surface of the cap plate 30 toward the electrode assembly 10.

The protrusion part 31 has a cylindrical shape and is integrally formed with the cap plate 30. In one embodiment, the protrusion part 31 has a body part 31c and a deformation part 31a. The body part 31c has a cylindrical shape and extends from the cap plate 30 to protrude to the inside of the case 20. The deformation part 31a corresponds to a bottom end of the body part 31c and is formed when the protrusion part 31 is spread relative to the body part 31c due to a pressure applied to the protrusion part 31. The deformation part 31a is spread to extend to a rivet groove 31b, which will be described further later herein.

The rivet groove 31b is formed around a periphery of the protrusion part 31 to have a width (e.g., a predetermined width). For example, the rivet groove 31b, in one embodiment, is shaped as a ring so as to surround the periphery of the protrusion part 31. However, in other embodiments, the rivet groove 31b may have various shapes other than the ring shape, which will be described further later herein.

Figure 5:
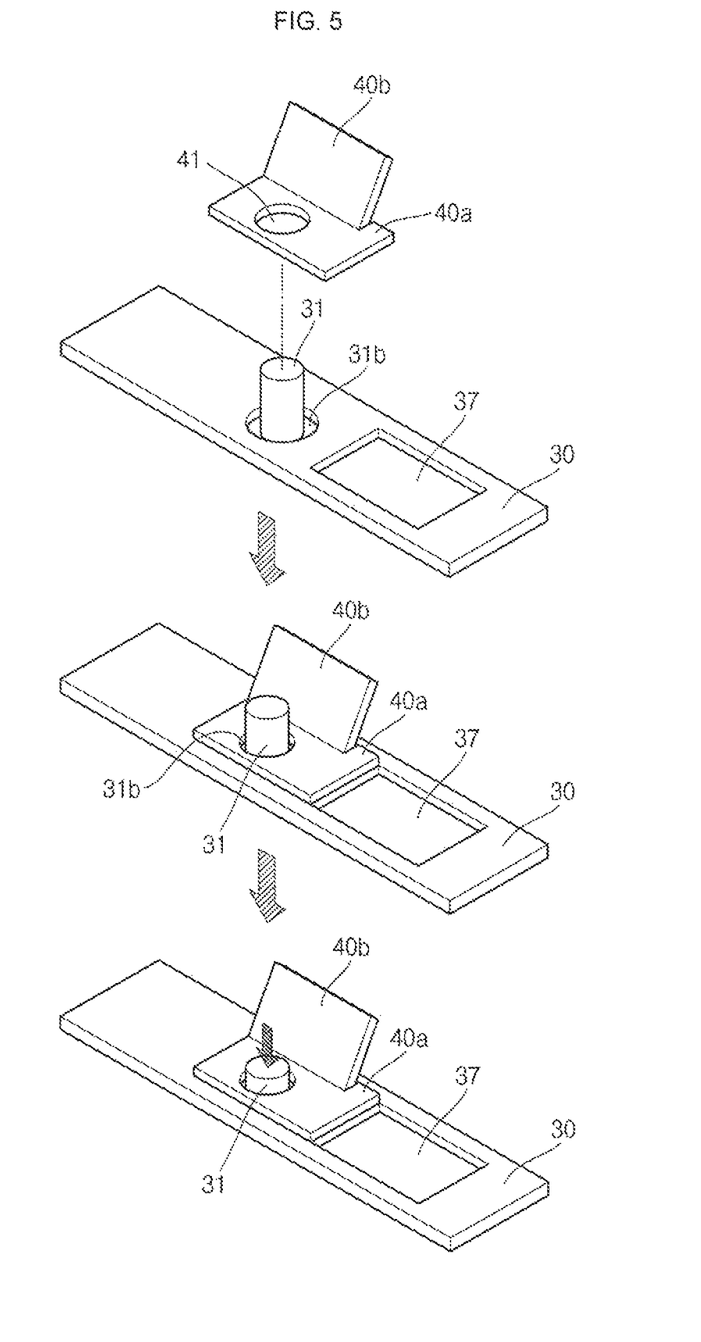
FIG. 5 is a bottom perspective view illustrating a coupling process of a cap plate an a positive electrode lead in the secondary battery shown in FIG. 1.

FIG. 5 is a bottom perspective view illustrating a coupling process of cap plate and a positive electrode lead in the secondary battery 100.

Referring to FIG. 5, the positive electrode lead 40 may be coupled to the cap plate 30 by the protrusion part 31 protruding from the cap plate 30.

In one embodiment, the protrusion part 31 passes through the first part 40a of the positive electrode lead 40 disposed to face the cap plate 30 to be coupled to the first part 40a. To this end, the protrusion part 31 may have a diameter smaller than or equal to that of the through-hole 41. In one embodiment, the body part 31c of the protrusion part 31 is assembled to pass through the through-hole 41 formed in the first part 40a of the positive electrode lead 40. Here, a bottom end of the body part 31 is exposed to a bottom surface of the positive electrode lead 40. The bottom end of the body part 31 exposed to the bottom surface of the positive electrode lead 40 is compressively coupled to the bottom surface of the positive electrode lead 40 by riveting. The bottom end of the body pan 31c is compressed to be spread to a surrounding area. That is, the bottom end of the body part 31c is compressively spread to the surrounding area by striking the bottom end of the protrusion part 31 using a hammer, for example, to be spread to the rivet groove 31b formed around the protrusion part 31. The bottom end of the body part 31c, which is spread to the rivet groove 31b, forms the deformation part 31a. To this end, the riveted protrusion part 31 may have a greater diameter than the through-hole 41. The thus-formed deformation part 31a is compressively coupled to the bottom surface of the positive electrode lead 40 and the rivet groove 31b.

In the present embodiment, the ring-shaped rivet groove 31b is formed around the protrusion part 31 protruding from the bottom surface of the cap plate 30, thereby preventing or substantially preventing the cap plate 30 from extending in a vertical direction (e.g., the y-axis direction of FIGS. 6 to 8) with respect to a lengthwise direction (e.g., the z-axis direction of FIGS. 6 to 8) as the bottom end of the protrusion part 31 is compressed when the positive electrode lead 40 is coupled to the protrusion part 31 by riveting through the through-hole 41, and preventing or substantially preventing the cap plate 30 from being deformed (e.g., twisted).

Hereinafter, various shapes of the rivet groove formed on the bottom surface of the cap plate 30 will be described in further detail through some other exemplary embodiments. Since the secondary battery according to these embodiments of the present invention is substantially the same as the secondary battery 100 described above, except for a configuration of the rivet groove, the following description will focus only on the differences between the secondary batteries of these embodiments of the present invention.

Figure 6:
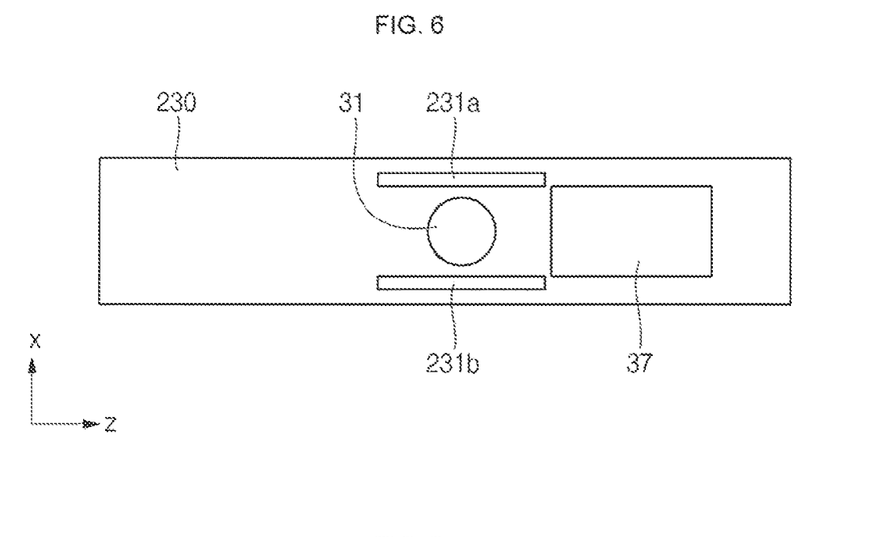
FIG. 6 is a bottom view illustrating configurations of a protrusion part and a rivet groove in a secondary battery according to another embodiment of the present invention.

FIG. 6 is a bottom view of a cap plate 230 including configurations of the protrusion part 31 and rivet grooves 231a, 231b in a secondary battery according to another embodiment of the present invention.

Referring to FIG. 6, the rivet grooves 231a and 231b may be linearly formed at one side of a periphery of the protrusion part 31 and the other side opposite to the one side to be spaced apart from each other and to be parallel with each other. That is, the linearly formed rivet grooves 231a and 231b correspond to opposite sides spaced apart from each other in view of the protrusion part 31 and may be formed in a lengthwise direction of the cap plate 30 (e.g., the z-axis direction).

Therefore, the bottom end of the protrusion part 31 is compressed to a surrounding area by striking the same using a hammer, for example, to be spread to extend over the rivet grooves 231a and 231b formed around the protrusion part 31. The bottom end of the protrusion part 31, which is spread to the rivet grooves 231a and 231b, forms deformation parts (not shown) at spaced-apart locations. The thus-formed deformation parts are compressively coupled to the bottom surface of the positive electrode lead 40 and the rivet grooves 231a and 231b.

In the present embodiment, the linear rivet grooves 231a and 31b parallel to each other are formed at opposite sides of the protrusion part 31 protruding from the bottom surface of the cap plate 30, thereby preventing or substantially preventing the cap plate 30 from extending in a vertical direction (e.g., the y-axis direction) with respect to a lengthwise direction (e.g., the z-axis direction) as the bottom end of the protrusion part 31 is compressed when the positive electrode lead 40 is coupled to the protrusion part 31 by riveting through the through-hole 41, and preventing or substantially preventing the cap plate 30 from being deformed (e.g., twisted).

Figure 7:
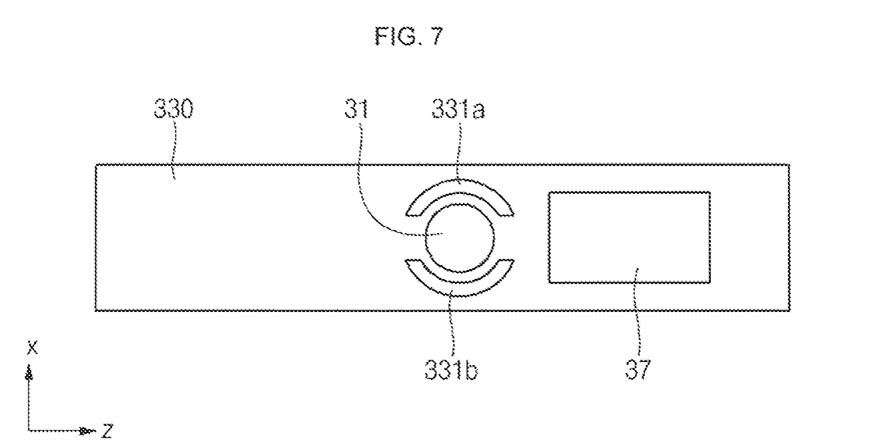
FIG. 7 is a bottom view illustrating configurations of a protrusion part and a rivet groove in a secondary battery according to another embodiment of the present invention.

FIG. 7 is a bottom view of a cap plate 330 including configurations of the protrusion part 31 and rivet grooves 331a, 331b in a secondary battery according to another embodiment of the present invention.

Referring to FIG. 7, the rivet grooves 331a and 331b may be formed in a curved manner at one side of a periphery of the protrusion part 31 and the other side opposite to the one side to be spaced apart from each other and to be symmetrical to each other.

That is, the curved rivet grooves 331a and 331b may be hemispherically formed at opposite sides of the protrusion part 31, spaced apart from each other.

Therefore, the bottom end of the protrusion part 31 is compressed to a surrounding area by striking the same using a hammer, for example, to be spread to extend over the rivet grooves 331a and 331b formed around the protrusion part 31. The bottom end of the protrusion part 31, which is spread to the rivet grooves 331a and 331b, forms deformation parts (not shown) at spaced-apart locations. The thus-formed deformation parts are compressively coupled to the bottom surface of the positive electrode lead 40 and the rivet grooves 331a and 331b.

Figure 8:
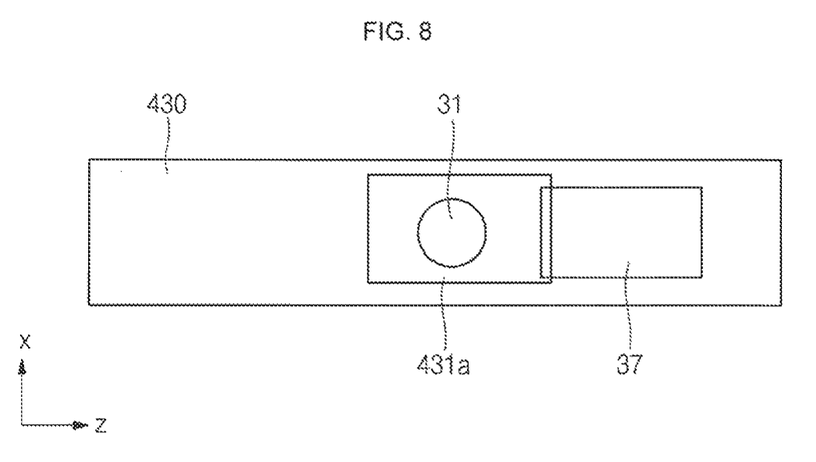
FIG. 8 is a bottom view illustrating configurations of a protrusion part and rivet groove in a secondary battery according to another embodiment of the present invention.

FIG. 8 is a bottom view of a cap plate 430 including configurations of the protrusion part 31 and a rivet groove 431a in a secondary battery according to another embodiment of the present invention.

Referring to FIG. 8, the rivet groove 431a may be formed to have a rectangular shape to surround a periphery of the protrusion part 31. In the present embodiment, the rivet groove 431a having a rectangular shape is illustrated by way of example, but aspects of the present invention are not limited thereto. For example, in another embodiment, the rivet groove 431a may be formed to have a polygonal shape.

That is, the rivet grooves 331a and 331b of FIG. 7 may be formed at opposite sides of the protrusion part 31 in a rectangular shape along the x-axis and z-axis directions.

Therefore, the bottom end of the protrusion part 31 is compressively spread to a surrounding area by striking the same using a hammer, for example, to be spread to the rivet groove 431a formed around the protrusion part 31. The bottom end of the protrusion part 31, which is spread to the rivet groove 431a, forms deformation parts (not shown) at spaced-apart locations. The thus-formed deformation parts are compressively coupled to a bottom surface of a positive electrode lead 40 and the rivet groove 431a.

In the present embodiment, the rectangular rivet groove 431a is formed around the protrusion part 31 protruding from the bottom surface of the cap plate 30, thereby preventing or substantially preventing the cap plate 30 from extending in a vertical direction (e.g., the y-axis direction) with respect to a lengthwise direction (e.g., the z-axis direction) as the bottom end of the protrusion part 31 is compressed when the positive electrode lead 40 is coupled to the protrusion part 31 by riveting through the through-hole 41, and preventing or substantially preventing the cap plate 30 from being deformed (e.g., twisted).

While the present invention has been particularly shown and described with reference to some exemplary embodiments thereof, it will be understood by those of ordinary skill in the art that various changes in form and details may be made therein without departing from the spirit and scope of the present invention as defined by the following claims and equivalents thereof.

What is claimed is:

1. A secondary battery comprising:
an electrode assembly;
an electrode lead attached to an electrode tab extending from the electrode assembly, the electrode lead having a through-hole formed therein;
a case accommodating the electrode assembly and the electrode lead; and
a cap plate coupled to the case to seal an opening of the case and comprising a protrusion part protruding to the inside of the case, the protrusion part being coupled to the electrode lead through the through-hole by riveting, wherein the cap plate has at least one rivet groove formed around a periphery of the protrusion part and having a depth in a thickness direction of the cap plate, and the at least one rivet groove receives the protrusion part compressed by a pressure applied thereto when the protrusion part is coupled to the electrode lead through the through-hole by riveting, the protrusion part being spread and extended into the at least one rivet groove to be contacting and electrically connected with the cap plate when the protrusion part is coupled to the electrode lead by riveting.

2. The secondary battery of claim 1, wherein the at least one rivet groove has a ring shape, a rectangular shape, or a polygonal shape to surround the periphery of the protrusion part.

3. The secondary battery of claim 1, wherein the at least one rivet groove comprises a pair of rivet grooves linearly formed at one side of the periphery of the protrusion part and the other side opposite to the one side to be spaced apart from each other and to be parallel with each other.

4. The secondary battery of claim 1, wherein the at least one rivet groove comprises a pair of rivet grooves formed in a curved manner at one side of the periphery of the protrusion part and the other side opposite to the one side to be spaced apart from each other and to be symmetrical to each other about the protrusion part.

5. The secondary battery of claim 1, wherein the protrusion part comprises:
a body part extending from the cap plate and protruding to the inside of the case; and
a deformation part at an end of the body part and spread to the outside of the body part by pressure applied to the protrusion part.

6. The secondary battery of claim 5, wherein the deformation part extends over the at least one rivet groove.

7. The secondary battery of claim 1, wherein a diameter of the through-hole is greater than or equal to a diameter of the protrusion part.

8. The secondary battery of claim 1, wherein a diameter of the at least one rivet groove is greater than a diameter of the through-hole.

9. The secondary battery of claim 1, wherein the electrode lead comprises:
a first part horizontally arranged to face the cap plate and having the through-hole; and
a second part bent from the first part to face the electrode tab.

10. The secondary battery of claim 1, wherein the protrusion part is integrally formed with the cap plate.

11. The secondary battery of claim 1, further comprising an electrode terminal exposed at an upper side of the cap plate, the electrode terminal being spaced apart from the protrusion part along a lengthwise direction of the cap plate.

12. The secondary battery of claim 1, wherein the protrusion part is overlapped in the thickness direction of the cap plate by a closed outer surface of the cap plate.

\* \* \* \* \*